No. 735,604. Patented August 4, 1903.

UNITED STATES PATENT OFFICE.

JOHN FRANCIS SMITH, OF CHICAGO, ILLINOIS.

PAINT COMPOUND.

SPECIFICATION forming part of Letters Patent No. 735,604, dated August 4, 1903.

Application filed February 16, 1903. Serial No. 143,639. (No specimens.)

*To all whom it may concern:*

Be it known that I, JOHN FRANCIS SMITH, a citizen of the United States, residing at Chicago, in the county of Cook and State of Illinois, have invented certain new and useful Improvements in Paint Compounds; and I do hereby declare the following to be a full, clear, and exact description of the invention, such as will enable others skilled in the art to which it appertains to make and use the same.

My invention relates to improvements in paint compounds; and the object of the same is the making of oil-colors in the solidified or stick instead of the regular form, so that it is unnecessary to have palette and brushes. The advantage in making my compound in the solidified form lies in the fact that the same can be applied directly on the canvas or other material by applying the stick of oil-paint directly to the canvas, thus eliminating the employing of the said brushes and palette. If it is desired, the said oil-paint stick can be used in conjunction with the liquid oil color.

In the compounding of my invention I employ three independent formulas. I will indicate the three formulas by the numerals 1, 2, and 3. The formula No. 1 is obtained by dissolving three-tenths of white beeswax in three-tenths of spirits of turpentine, and to this I add one-tenth of gelatin of first quality, which has been dissolved in three-tenths of boiling water. The second formula or mixture is composed of one-tenth of any copal-gum which has been dissolved in two-tenths of spirits of turpentine, to which I add one-tenth of wood-alcohol and six-tenths of boiled linseed-oil. The third formula is an emulsion and is obtained by compounding three-tenths of paraffin, three-tenths of raw linseed-oil, one-tenth of spirits of ammonia, and three-tenths water. This formula is made by putting paraffin, raw linseed-oil, and water in a vessel and placing it over a fire and when boiling pour in the correct proportion of ammonia, while stirring rapidly. With the formula No. 1 mix an equal quantity of dry color. By this process I inclose each particle of coloring-matter in wax, thereby protecting the color from atmospheric changes and from the chemical action of one color upon another—as, for example, the umbers and other browns blacken of themselves and also penetrate and blacken all other colors over them in a painting and also all colors that may be under them. By thus incasing each particle of color in wax they become fixed and are held so the operator can use the most fugitive colors, and they become permanent and reliable, and all colors are more surely and luminously preserved. The gelatin which I add in compounding the paint gives solidity. With the formula No. 2 I also mix a small quantity of dry color, this mixture giving body richness and elasticity. Amalgamate the above two formulas with formula No. 3. This process is necessary, as where Nos. 1 and 2 are mixed they form a granulated substance, and to make this cohesive and of the necessary substances they must be mixed with No. 3, after which the mixture is of a perfect consistence. The compound is then put in molds of a size to make a convenient stick to use in painting, and after drying each stick is given a bath of gelatin. The gelatin both suspends any further drying and prevents the paint-stick from getting hard.

The advantage obtained by my compound lies in the fact that in painting brushes and the palette have been so universally used that it is thought almost impossible to do anything without them; but with this solidified oil-paint the painting of pictures entirely without the palette as the paint is applied directly to the canvas is obtained. The paint-stick may be sharpened to give the thinnest line or applied in a large mass. Another advantage is that the care and expense of brushes and palette are entirely done away with, as is also the waste of extra paint which may have remained upon the said brushes or palette when the painter desires to discontinue the use of the said implements. Another advantage is that the paint can be applied one color upon another and the said paint always remaining fresh as when applied, as practically all the particles of color are incased in wax and so remain permanent, there being sufficient copal-gum to make them elastic. A picture painted in them will never crack.

The strength of all the ingredients used in this compound varies—i. e., some being purer than others—and for this reason the preparation of the ingredients used in the composition varies accordingly. It will be understood that the ingredients have no commercial standard, and hence the mixtures must be controlled according to the excellency or inferiority of the ingredients.

Having thus fully described my invention, what I claim, and desire to secure by Letters Patent, is—

1. A paint compound consisting of wax, gelatin, paraffin, gum, and dissolvents, substantiallly as described.

2. A paint compound consisting of wax, gelatin, gum-copal, oil and other dissolvents, substantially as described.

3. A paint compound consisting of wax, gelatin, alcohol, and other dissolvents, substantially as described.

4. A paint compound comprising wax, gelatin, gum, turpentine and other dissolvents, substantially as described.

5. A paint compound, comprising wax, gelatin, gum, oil and other dissolvents, substantially as described.

6. A paint compound comprising wax, gelatin, gum, alcohol and other dissolvents, substantially as described.

7. A paint compound comprising wax, gelatin, copal-gum, wood-alcohol, ammonia and other dissolvents, substantially as described.

8. A paint compound comprising wax, gelatin, paraffin, oil, gum, and liquids, substantially as described.

9. A paint compound comprising wax, gelatin, gum-copal, turpentine and other dissolvents mixed with water, substantially as described.

10. A paint compound comprising wax, gelatin, gum, turpentine, oil and other dissolvents, substantially as described.

11. A paint compound comprising wax, gelatin, gum, turpentine, oil, alcohol and other dissolvents, substantially as described.

12. A paint compound comprising wax, gelatin, gum, turpentine, oil, alcohol, ammonia, mixed with water, substantially as described.

13. A paint compound comprising gelatin, gum-copal, linseed-oil and other dissolvents, mixed with coloring-matter and water, substantially as described.

14. A paint compound comprising raw linseed-oil, gelatin, gum, dry colors, and liquids, substantially as described.

15. A paint compound comprising wax, gelatin, boiled linseed-oil, animal matter and liquids combined, substantially as described.

16. A paint compound put up in stick form comprising, wax, gelatin, gum-copal, water, spirits of turpentine, and other dissolvents, substantially as described.

17. A paint compound put up in stick form comprising wax, gelatin, raw linseed-oil, boiled linseed-oil, and other dissolvents compounded, substantially as described.

18. A paint compound put up in stick form comprising wax, gelatin, gum, coloring-matter, wood-alcohol, spirits of ammonia, water and other dissolvents, substantially as described.

19. A paint compound consisting of wax, water, turpentine, gelatin and paraffin, gum-copal, alcohol, linseed-oil, and ammonia mixed and dissolved with coloring-matter in the manner and proportions as is hereinbefore described.

20. A paint compound consisting of spirits of turpentine, white beeswax, gelatin, boiling water, copal-gum, boiled linseed-oil, wood-alcohol, paraffin, raw linseed-oil, water, spirits of ammonia compounded with dry color in the manner as is hereinbefore specified.

21. A paint compound consisting of formula 1, spirits of turpentine, white beeswax, gelatin and boiling water: formula 2 consisting of copal-gum, boiled linseed-oil, spirits of turpentine and wood-alcohol, the first and second formulas being compounded with the third formula consisting of paraffin, raw linseed-oil, water and spirits of ammonia in the manner and proportions hereinbefore specified.

22. A paint compound consisting of three formulas compounded as follows: 1, turpentine, wax, gelatin, and water; 2, gum-copal, oil, turpentine and alcohol; 3, wax, linseed-oil, water and ammonia mixing the said three formulas in the manner and with dry colors as is hereinbefore fully described.

23. As an improved article of manufacture, a paint compound put up in stick form comprising the following ingredients: turpentine, wax, gelatin, water, gum-copal, boiled linseed-oil, alcohol, raw linseed-oil, paraffin, ammonia and dry color compounded as is hereinbefore fully described.

24. As an improved article of manufacture, a paint compound put up in stick form comprising formula 1: turpentine, wax, gelatin, and water; formula 2: gum-copal, boiled linseed-oil, turpentine, and alcohol; formula 3: wax, raw linseed-oil, water, and ammonia, consisting of the preparations and compounded in the manner as is hereinbefore fully described.

25. A paint compound comprising wax, gelatin, linseed-oil, water, and other dissolvents, substantially as described.

26. A paint compound, comprising paraffin, wax, animal matter, gum, linseed-oil and other dissolvents, mixed with coloring-matter in the manner and for the purpose hereinbefore specified.

27. A paint compound comprising wax, animal matter, gum-copal, alcohol, ammonia, and other dissolvents, substantially as described.

28. A paint compound comprising beeswax, paraffin, gelatin, and dissolvents, substantially as described.

29. A paint compound comprising wax, turpentine, linseed-oil, ammonia, and other dissolvents, substantially as described.

30. A paint compound put up in stick form comprising wax, gelatin, animal matter, oil, alcohol, ammonia, and other dissolvents, substantially as described.

In testimony whereof I hereunto affix my signature in presence of two witnesses.

JOHN FRANCIS SMITH.

Witnesses:
GEORGE E. WISSLER,
CHARLES C. SPENCER.